(12) United States Patent
Braun et al.

(10) Patent No.: US 11,041,407 B2
(45) Date of Patent: Jun. 22, 2021

(54) TURBOMACHINE

(71) Applicant: MAN Energy Solutions SE, Augsburg (DE)

(72) Inventors: Steffen Braun, Augsburg (DE); Frank Griesshaber, Augsburg (DE); Vladimir Hort, Velká Bíteš (CZ)

(73) Assignee: MAN ENERGY SOLUTIONS SE, Augsburg (DE)

( * ) Notice: Subject to any disclaimer, the term of this patent is extended or adjusted under 35 U.S.C. 154(b) by 63 days.

(21) Appl. No.: 16/142,455

(22) Filed: Sep. 26, 2018

(65) Prior Publication Data
US 2019/0093515 A1 Mar. 28, 2019

(30) Foreign Application Priority Data

Sep. 26, 2017 (DE) .................. 10 2017 122 230.8

(51) Int. Cl.
*F01D 25/26* (2006.01)
*F01D 25/24* (2006.01)
*F02B 37/00* (2006.01)
*F04D 29/40* (2006.01)

(52) U.S. Cl.
CPC .......... *F01D 25/26* (2013.01); *F01D 25/243* (2013.01); *F02B 37/00* (2013.01); *F04D 29/403* (2013.01); *F05D 2220/40* (2013.01); *F05D 2240/14* (2013.01); *F05D 2260/311* (2013.01)

(58) Field of Classification Search
CPC ...... F01D 25/243; F01D 25/26; F01D 21/045; F04D 29/403; F04D 29/4206
See application file for complete search history.

(56) References Cited

U.S. PATENT DOCUMENTS

| 6,997,672 | B2 * | 2/2006 | Wand | F01D 9/026 415/1 |
| 7,121,758 | B2 * | 10/2006 | McMillan | F01D 21/045 403/408.1 |
| 8,528,328 | B2 * | 9/2013 | Stroph | F01D 9/026 60/605.1 |
| 9,145,682 | B1 * | 9/2015 | Tanaka | E04C 3/32 |

OTHER PUBLICATIONS

"Chapter 3: Rigid Bodies; Equivalent Systems of Forces", Sep. 4, 2009 (Year: 2009).*

* cited by examiner

*Primary Examiner* — Eldon T Brockman
*Assistant Examiner* — Michael K. Reitz
(74) *Attorney, Agent, or Firm* — Cozen O'Connor

(57) ABSTRACT

A turbocharger includes a turbine with a housing and a rotor for expanding a first medium; a compressor with a housing and a rotor for compressing a second medium utilizing energy extracted in the turbine during expansion of the first medium. A housing surrounds the turbine housing and/or the compressor housing and/or the bearing housing at least in sections, which housing is at least formed from a first housing section and a second housing section, which are connected to one another via screw connections. On the first housing section, shearing force absorption elements are formed or fastened which extend through the second housing section and in the event that shearing forces occur, absorb the shearing forces and thus relieve the screw connections of the shearing forces.

16 Claims, 3 Drawing Sheets

TURBOMACHINE

1. FIELD OF THE INVENTION

The invention relates to a turbocharger.

2. BACKGROUND OF THE INVENTION

The fundamental construction of a turbocharger is known to the person skilled in the art addressed here. A turbocharger comprises a turbine, in which a first medium is expanded. Furthermore, a turbocharger comprises a compressor in which a second medium is compressed, namely utilizing the energy extracted in the turbine during the expansion of the first medium. The turbine of the turbocharger comprises a turbine housing and a turbine rotor. The compressor of the turbocharger comprises a compressor housing and a compressor rotor. Between the turbine housing of the turbine and the compressor housing of the compressor a bearing housing is positioned, wherein the bearing housing is connected on the one hand to the turbine housing and on the other hand to the compressor housing. In the bearing housing, a shaft is mounted via which the turbine rotor is coupled to the compressor rotor.

During the operation of a turbocharger there is the risk that a rotor, for example the turbine rotor or the compressor rotor of the turbocharger breaks and fragments of the rotor strike through the relevant housing, i.e. the turbine housing or the compressor housing. There is then the risk that the fragments of the turbocharger enter the surroundings. In order to take into account this problem of the bursting of a rotor of the turbocharger, the respective housing, in turbochargers known from practice, is designed in such a manner that a failure of the respective housing need not be expected and even when the respective rotor should break, fragments of the same cannot strike through the respective housing. However, this increases the weight of the turbocharger.

In order to avoid having to increase the weight of a turbocharger as a consequence of a burst protection safeguard and in order to be able, on the other hand, to suitably retrofit existing older exhaust gas turbochargers, it is known from DE 10 2013 013 571 A1 to envelop the compressor housing and/or the turbine housing of the turbocharger with an annular fabric at least in sections, which in the event of a failure retains fragments, thus increasing the containment safety of a turbocharger.

Furthermore it is already known from practice to provide the burst protection and thus the containment protection by way of a housing which at least in sections surrounds the turbine housing and/or the compressor housing and/or the bearing housing, wherein such a housing is formed from multiple sections which are connected to one another via screw connections. In particular when in the event of a failure fragments of a rotor of the turbocharger strike the housing there is the risk here that the screw connections are subject to shearing forces as a consequence of the bursting forces, which can then lead to a failure of the screw connections. There is a need for increasing the containment safety on a turbocharger which for providing a burst protection and thus a containment safety comprises multiple housing sections that are connected to one another via screw connections.

SUMMARY OF THE INVENTION

The present invention is based on the object of creating a new type of turbocharger. This object is achieved through a turbocharger comprising a turbine for expanding a first medium, wherein the turbine comprises a turbine housing and a turbine rotor; a compressor for compressing a second medium utilizing energy extracted in the turbine during expansion of the first medium, wherein the compressor comprises a compressor housing and a compressor rotor coupled to the turbine rotor via a shaft. The turbine housing and the compressor housing are each connected to a bearing housing arranged between the compressor housing and the turbine housing; the shaft being mounted in the bearing housing. The turbocharger further includes a housing which at least in sections surrounds the turbine housing and/or the compressor housing and/or the bearing housing, the housing being at least formed from a first housing section and a second housing section connected to one another; screw connections for connecting the at least first and second housing sections; and shearing force absorption elements formed or fastened on the first housing section and extending through the second housing section, the shearing force absorption elements constructed and disposed to absorb the shearing forces in the event of shearing forces occurring and to relieve the screw connections of the shearing forces.

As mentioned, on the first housing section, shearing force absorption elements are formed or fastened which extend through the second housing section and in the event of the occurrence of shearing forces, absorb the shearing forces and thus relieve the screw connections of the shearing forces. Shearing forces that occur in the event of bursting can be securely absorbed via the shearing force absorbing elements and thus the screw connections relieved. There is no risk that the screw connections fail as a consequence of shearing forces. This way the burst protection and thus the containment safety can be increased.

Preferentially, the shearing force absorption elements are arranged adjacently to the screw connections. Here, the shearing force absorption elements can be arranged laterally next to a screw connection or roundabout the screw connection. This way the burst protection or the containment safety can be particularly advantageously increased.

Preferentially, the shearing force absorption elements are welded to the first housing section and extend in each case through a recess in the second housing section. Alternatively, the respective shearing force absorption element is formed as an elevation, in particular as a deep-drawn or embossed dome of the housing section and extends through a recess in the second housing section. These features also serve to effectively absorb shearing forces and thus relieving the screw connections of a shearing load.

The shearing force absorption elements are preferentially employed on the housing of a turbocharger. The shearing force absorption elements can however be employed also on other elements of a turbocharger to be connected, for example for connecting a first stator-side element of the turbocharger to a second stator-side element of the turbocharger and/or for connecting a first rotor-side element of the turbocharger to a second rotor-side element of the turbocharger.

BRIEF DESCRIPTION OF THE DRAWINGS

Exemplary embodiments of the invention are explained in more detail by way of the drawing in which.

DETAILED DESCRIPTION OF THE PRESENTLY PREFERRED EMBODIMENTS

Figure 1:
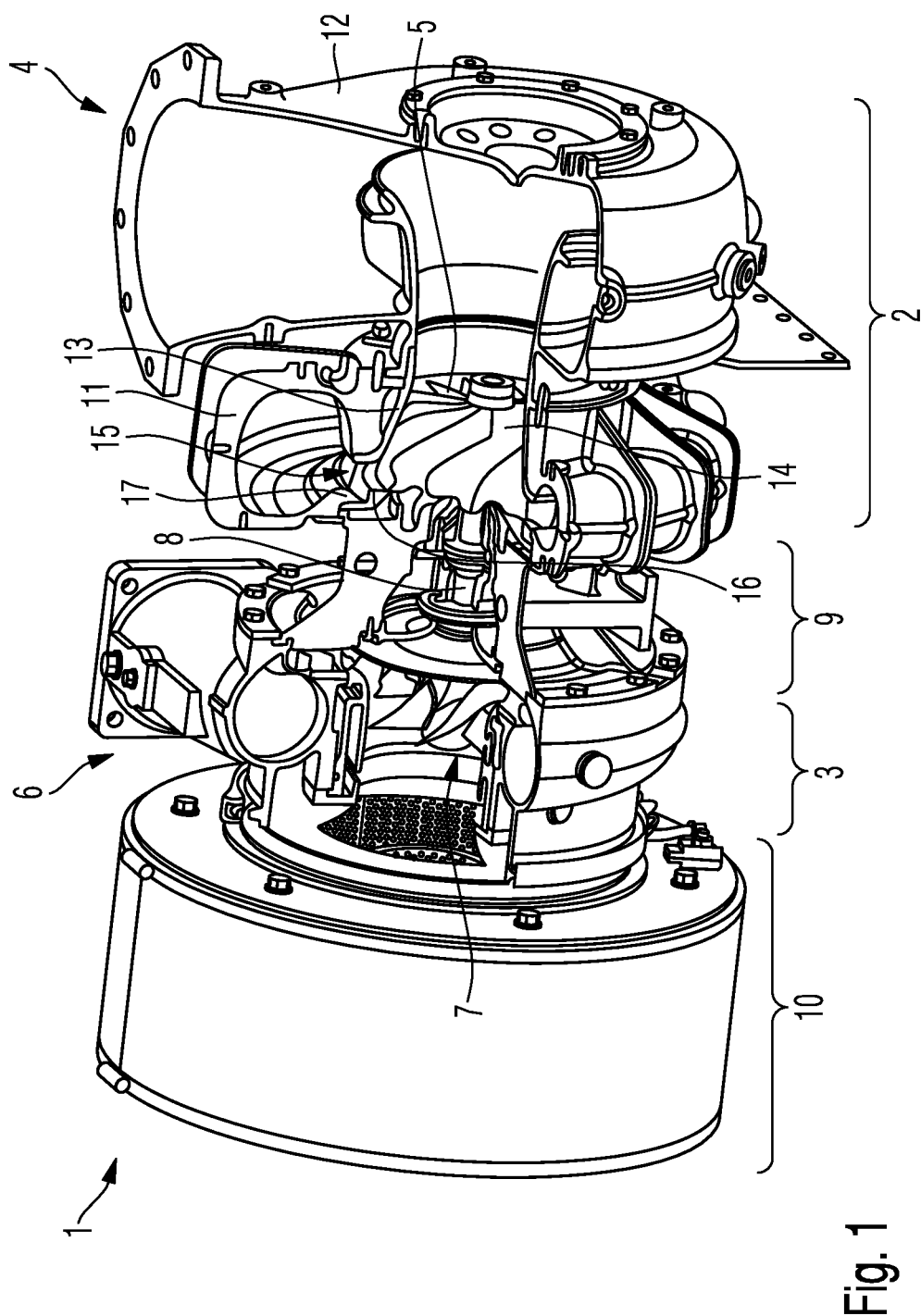
FIG. 1 is a cross-sectional view through a turbocharger.

FIG. 1 shows the fundamental construction of a turbocharger 1 with a turbine 2 for expanding a first medium, in particular for expanding exhaust gas of an internal combustion engine. Furthermore, a turbocharger 1 has a compressor 3 for compressing a second medium, in particular charge air, namely utilizing energy extracted in the turbine 2 during the expansion of the first medium.

Here, the turbine 2 comprises a turbine housing 4 and a turbine rotor 5. The compressor 3 comprises a compressor housing 6 and a compressor rotor 7. The compressor rotor 7 is coupled to the turbine rotor 5 via a shaft 8 which is mounted in a bearing housing 9, wherein the bearing housing 9 is positioned between the turbine housing 4 and the compressor housing 6 and is connected both to the turbine housing 4 and the compressor housing 6. FIG. 1, furthermore, shows a compressor-side silencer 10.

The turbine housing 4 of the turbine 2 comprises an inflow housing 11 and an outflow housing 12. By way of the inflow housing 11, the first medium to be expanded in the region of the turbine 2 can be fed to the turbine rotor 5. By way of the outflow housing 12, first medium expanded in the region of the turbine rotor 5 flows away from the turbine 2.

Besides the inflow housing 11 and the outflow housing 12, the turbine housing 4 comprises an insert piece 13, wherein the insert piece 13 extends in particular in the region of the inflow housing 11, namely adjacently to the turbine rotor 5 radially outside adjoining moving blades 14 of the turbine rotor 5.

The turbine housing 4, furthermore, comprises a nozzle ring 15. The nozzle ring 15 is also described as turbine guide apparatus.

FIG. 1, furthermore, shows a sealing cover 16 in the connecting region of inflow housing 11 and bearing housing 9. The sealing cover 16 is also described as bearing housing cover or heat shield.

The inflow housing 11 of the turbine 2 is connected to the bearing housing 9 by way of a fastening device 17 which is preferentially embodied as a clamping claw. A radially outer section of the sealing cover 16 is clamped in this connecting region between bearing housing 9 and inflow housing 11 of the turbine. Preferentially, the nozzle ring 15 is also clamped with a section in this connecting region.

During the operation of such a turbocharger 1, a damage event can occur in the region of the turbine rotor 5 or of the compressor rotor 7. Fragments from the respective rotor 5 or 7 can then be detached and strike the respective housing 4 or 6, by way of which the housing 4 or 6 is subjected to damage. Accordingly it can be the case for example that in particular when the turbine rotor 5 breaks, fragments of the same reach the inflow housing 11 of the turbine housing 4 striking through the same. For this reason it is required to provide a suitable burst protection for increasing the so-called containment safety.

Figure 2:
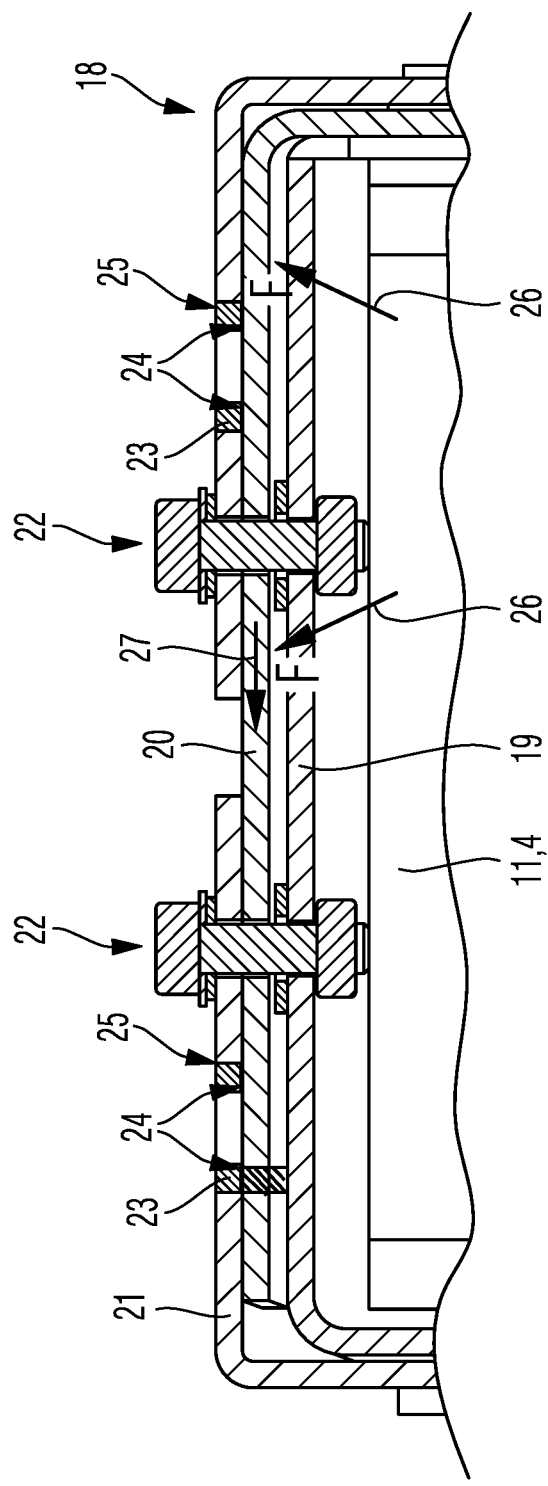
FIG. 2 is a partial detailed cross-sectional view of a turbocharger according to the invention.

FIG. 2 shows a cross section by way of an extract through a turbocharger 1 according to the invention in the region of an inflow housing 11 of the turbine housing 4 of the turbocharger, wherein the turbine housing 4, namely the inflow housing 11 of the same, is surrounded according to FIG. 2 by a housing 18 at least in sections.

In the shown exemplary embodiment, the housing 18 consists of multiple housing sections 19, 20 and 21, which are connected to one another via screw connections 22. Accordingly, the screw connections 22 extend through recesses in the housing sections 19, 20 and 21 in order to connect the same to one another.

In terms of the present invention, at least one shearing force absorption element 23 is formed on the housing section 20 or fastened to the same. The shearing force absorption elements 23 that are formed or fastened to the housing section 20 extend through the adjoining housing section 21 and, in particular in the event of bursting, i.e. when bursting forces 26 cause shearing forces 27 on the housing sections 20, absorb the shearing forces and thus relieve the screw connections 22 of the shearing forces.

Shearing forces that occur are accordingly absorbed by the shearing force absorption elements 23 and the same need not be absorbed by the screw connections 22 so that there is then no risk that the screw elements 22 fail as a consequence of shearing forces in the event of a damage or bursting.

According to FIG. 2, the shearing force elements 23 are arranged adjacent to the screw connections 22. Here, a shearing force absorption element 23 is arranged in the region of each screw connection 22, namely in FIG. 2 laterally next to the respective screw connection.

Figure 3:
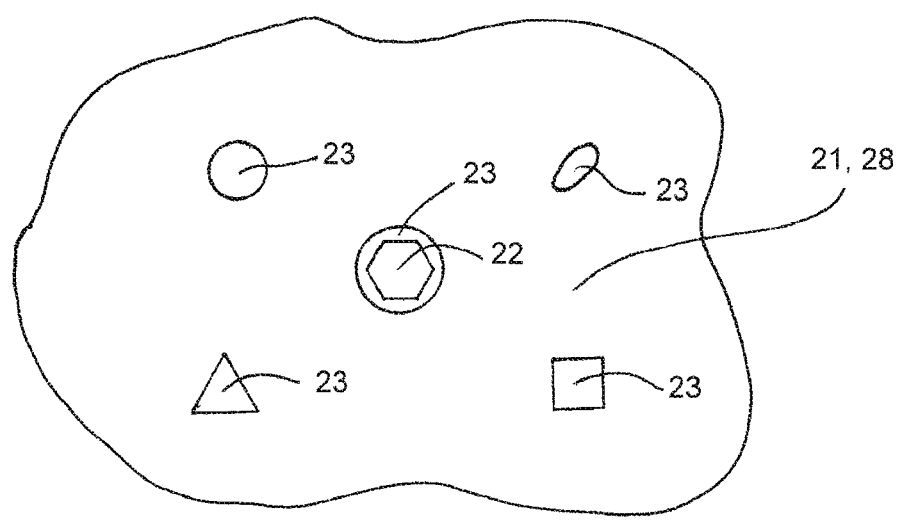
FIG. 3 is a plan view of a turbocharger housing section of the present invention.

In the shown exemplary embodiment, the respective shearing force absorption element 23 is designed annularly and welded to the housing section 20 forming a weld seam 24. The respective shearing force absorption element 23 can also be contoured to be circular or oval or angular as shown in FIG. 3.

The respective shearing force absorption element 23 extends through a recess 25 in the adjoining housing section 21. Should shearing forces 27 occur, the shearing force absorption elements 23 absorb these shearing forces.

In the shown exemplary embodiment of FIG. 2, three housing sections 19, 20 and 21 are present, wherein the shearing force absorption elements 23 are fastened to the housing section 20 and extend through recesses 25 in the housing section 21. In contrast with this it is also possible that the shearing force absorption elements 23 are formed on the housing section 19 and extend through recesses in the housing section 20 and/or through recesses in the housing section 21.

It is possible, furthermore, that merely two housing sections are present, for example the housing sections 19 and 20, wherein the shearing force absorption elements 23 are then connected to the housing section 19 by welding and extend through recesses in the housing section 20.

In the shown exemplary embodiment, the shearing force absorption elements 23 are positioned laterally next to the screw connections 22. In contrast with this it is also possible that the angular shearing force absorption elements 23 extend round about the screw connections 22, wherein the screw connections 22 then extend through a central recess in the shearing force absorption element 23.

With the invention present here an effective burst protection and thus an effective containment safety can be provided on a turbocharger with a housing. There is no risk that screw connections, which connect the housing sections to one another, fail as a consequence of shearing forces.

The shearing forces are rather absorbed by the shearing force absorption elements 23, which are connected to a housing section in particular by welding and extend through recesses in an adjoining housing section.

The shearing force absorption elements 23 and the screw connections 22 can be designed or dimensioned with a view to their function. Accordingly, the shearing force absorption elements 23 are dimensioned or designed with a view to the absorption of shearing forces. The screw connections 22, by contrast, which are not exposed to any shearing forces, can be designed for their connecting function and thus for absorbing tensile forces and compressive forces.

The shearing force absorption elements 23 can also be designed as elevations or domes of the housing section 20 by forming, in particular deep-drawing or embossing, which extend through a respective recess in the housing section 21.

The shearing force absorption elements 23 are preferentially employed on the housing of a turbocharger. The shearing force absorption elements 23 however can also be employed on other components of a turbocharger to be connected, for example for connecting a first stator-side element of the turbocharger to a second stator-side element of the turbocharger and/or for connecting a first rotor-side element of the turbocharger to a second rotor-side element of the turbocharger. Reference can be made to the above explanations.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A turbocharger comprising:
a turbine for expanding a first medium, wherein the turbine comprises a turbine housing and a turbine rotor;
a compressor for compressing a second medium utilizing energy extracted in the turbine during expansion of the first medium, wherein the compressor comprises a compressor housing and a compressor rotor coupled to the turbine rotor via a shaft;
wherein the turbine housing and the compressor housing are each connected to a bearing housing arranged between the compressor housing and the turbine housing; the shaft being mounted in the bearing housing;
a housing at least in sections surrounding the turbine housing and/or the compressor housing and/or the bearing housing, the housing at least formed from a first housing section and a second housing section connected to one another;
screw connections arranged at respective first locations for connecting the at least first and second housing sections; and
shearing force absorption elements that are solid in cross section and formed or fastened on the first housing section and extending through the second housing section at respective second locations that are different than and entirely radially offset from the respective first locations, the shearing force absorption elements constructed and disposed to absorb the shearing forces in the event of shearing forces occurring and to relieve the screw connections of the shearing forces.

2. The turbocharger according to claim 1, wherein the shearing force absorption elements are arranged adjacent to the screw connections.

3. The turbocharger according to claim 2, wherein a shearing force absorption element is arranged in a region of each screw connection.

4. The turbocharger according claim 1, wherein the respective shearing force absorption element is arranged laterally next to a screw connection.

5. The turbocharger according claim 1, wherein the respective shearing force absorption element is designed annularly.

6. The turbocharger according claim 1, wherein the respective shearing force absorption element is contoured to be circular or oval or angular.

7. The turbocharger according claim 1, wherein the respective shearing force absorption element is welded to the first housing section and extends through a recess in the second housing section.

8. The turbocharger according claim 1, wherein the respective shearing force absorption element is designed as elevation of the first housing section and extends through a recess in the second housing section.

9. A turbocharger comprising:
a turbine for expanding a first medium, wherein the turbine comprises a turbine housing and a turbine rotor;
a compressor for compressing a second medium utilizing energy extracted in the turbine during expansion of the first medium, wherein the compressor comprises a compressor housing and a compressor rotor coupled to the turbine rotor via a shaft;
wherein the turbine housing and the compressor housing are each connected to a bearing housing arranged between the compressor housing and the turbine housing; the shaft being mounted in the bearing housing;
screw connections arranged at respective first locations and configured to connect a first element of the turbocharger to a second element of the turbocharger; and
shearing force absorption elements that are solid in cross section and arranged at respective second locations that are different than and entirely radially offset from the respective first locations and formed or fastened on the first element extending and through the second element, the shearing force absorption elements constructed and disposed to absorb the shearing forces in the event of shearing forces occurring and to relieve the screw connections of the shearing forces.

10. The turbocharger according to claim 9, wherein the shearing force absorption elements are arranged adjacent to the screw connections.

11. The turbocharger according to claim 9, wherein a shearing force absorption element is arranged in a region of each screw connection.

12. The turbocharger according to claim 9, wherein the respective shearing force absorption element is arranged laterally next to a screw connection.

13. The turbocharger according to claim 9, wherein the respective shearing force absorption element is designed annularly.

14. The turbocharger according to claim 9, wherein the respective shearing force absorption element is contoured to be circular or oval or angular.

15. The turbocharger according to claim 9,
wherein the respective shearing force absorption element is welded to the first element and extends through a recess in the second element.

16. The turbocharger according to claim 9, wherein the respective shearing force absorption element is designed as elevation of the first element section and extends through a recess in the second element.

* * * * *